(12) United States Patent
Burch (10) Patent No.: US 7,625,647 B2
(45) Date of Patent: Dec. 1, 2009

(54) FUEL CELL SYSTEM WITH INTEGRATED THERMAL-TO-ELECTRIC GENERATING DEVICES

(75) Inventor: Steven D. Burch, Honeoye Falls, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 527 days.

(21) Appl. No.: 10/315,772

(22) Filed: Dec. 9, 2002

(65) Prior Publication Data

US 2004/0101750 A1  May 27, 2004

(51) Int. Cl.
*H01M 8/06* (2006.01)
*H01M 8/04* (2006.01)

(52) U.S. Cl. .............. 429/17; 429/19; 429/26

(58) Field of Classification Search .............. None
See application file for complete search history.

(56) References Cited

U.S. PATENT DOCUMENTS

| | | | |
|---|---|---|---|
| 3,006,979 A | 10/1961 | Rich | 136/4 |
| 3,992,223 A | 11/1976 | Gutbier | 429/14 |
| 4,522,894 A * | 6/1985 | Hwang et al. | 429/17 |
| 5,678,410 A | 10/1997 | Fujita et al. | 62/7 |
| 5,753,383 A | 5/1998 | Cargnelli et al. | 429/13 |
| 5,759,712 A | 6/1998 | Hockaday | 429/30 |
| 5,875,098 A * | 2/1999 | Leavitt et al. | 361/708 |
| 5,959,240 A | 9/1999 | Yoshida et al. | 136/205 |
| 6,307,142 B1 | 10/2001 | Allen et al. | 136/205 |
| 6,423,896 B1 | 7/2002 | Keegan | 136/253 |
| 6,444,179 B1 * | 9/2002 | Sederquist | 422/191 |
| 6,458,478 B1 | 10/2002 | Wang et al. | 429/17 |
| 6,551,732 B1 * | 4/2003 | Xu | 429/17 |
| 6,630,260 B2 * | 10/2003 | Forte et al. | 429/19 |
| 6,743,410 B2 * | 6/2004 | Robb | 423/651 |
| 6,838,062 B2 * | 1/2005 | Goebel et al. | 422/198 |
| 6,875,246 B2 * | 4/2005 | Burch et al. | 48/61 |
| 6,916,565 B2 | 7/2005 | Shioya | |
| 6,926,748 B2 * | 8/2005 | Goebel et al. | 48/127.9 |
| 7,138,197 B2 * | 11/2006 | Forte et al. | 429/17 |
| 7,172,638 B2 * | 2/2007 | Robb | 48/214 A |
| 2002/0110504 A1 * | 8/2002 | Gittleman et al. | 422/190 |
| 2002/0110710 A1 * | 8/2002 | Keskula et al. | 429/13 |
| 2002/0114984 A1 * | 8/2002 | Edlund et al. | 429/19 |
| 2002/0168316 A1 * | 11/2002 | Goebel et al. | 423/652 |
| 2003/0129108 A1 * | 7/2003 | Burch et al. | 422/188 |
| 2004/0151965 A1 * | 8/2004 | Forte et al. | 429/34 |

FOREIGN PATENT DOCUMENTS

| | | | |
|---|---|---|---|
| DE | 101 07 419 A1 | | 8/2002 |
| DE | 601 14 892 T2 | | 5/2006 |
| JP | 4-280484 | * | 10/1992 |
| WO | WO 03/060043 | * | 7/2003 |
| WO | WO 03/092879 | * | 11/2003 |
| WO | WO 2004/013482 | * | 2/2004 |

OTHER PUBLICATIONS

Certified translation of JP 4-280484, Oct. 6, 1992.*
James Zizelman, Steven shaffter and Subhasish Mukerjee, "Solid Oxide Fuel Cell Auxiliary Power Unit—A Development Update", SAE 2002-01-0411, Mar. 4-7, 2002.
The Chemical Engineers' Resource Page What is Pinch Technology? [online: http://www.cheresources.com/pinchtech2.shtml], Dec. 14, 2001.
Aleksandr S. Kushch et al.; Thermoelectric Development at Hi-Z Technology; Diesel Engine Emission Reduction Workshop; Aug. 6-10, 2001, Portsmouth, Virginia.

* cited by examiner

*Primary Examiner*—Jonathan Crepeau
(74) *Attorney, Agent, or Firm*—Dinsmore & Shohl LLP (57) ABSTRACT

A set of fuel cell system heat exchangers that have been modified to incorporate thermal-to-electric devices is disclosed. These devices convert a portion of the thermal energy flowing through each heat exchanger to electric energy. Methods for operating the fuel cell system are also disclosed.

15 Claims, 4 Drawing Sheets

FUEL CELL SYSTEM WITH INTEGRATED THERMAL-TO-ELECTRIC GENERATING DEVICES

BACKGROUND OF THE INVENTION

The present invention relates generally to fuel cell systems and particularly, to a fuel cell system having a set of heat exchangers with integrated electric generating devices to convert a portion of the thermal energy flowing through each heat exchanger to electric energy. The present invention may be used in small-scale, highly integrated fuel cell systems, such as those used in automobiles or homes.

Fuel cells convert fuel directly into energy through a chemical reaction, which extract more power out of the same quantity of fuel when compared to traditional combustion. In either a pure-hydrogen or a fuel reformer-based fuel cell system, there is a significant quantity of thermal energy (heat) exchanged between process fluids and ambient air. Further efficiency can be achieved in such fuel cell systems if the surplus heat produced by the system is utilized. Accordingly, there is a continued need to achieve higher overall system efficiencies in small-scale, highly integrated fuel cell systems.

SUMMARY OF THE INVENTION

The present invention addresses the above-mentioned need by providing a set of fuel cell system heat exchangers which have integral thermal-to-electric devices such as, for example, thermoelectric-, thermionics-, and/or thermophotovoltaics-based devices.

A fuel cell system is disclosed, which comprises an auto-thermal reformer for producing a heated reformate from a provided fuel mixture through a chemical reaction, and a heat exchanger in fluid communication with the auto-thermal reformer for receiving the heated reformats. The fuel cell system further includes a thermoelectric module disposed in thermal communication with at least a portion of the heat exchanger, and which is adapted to produce electricity from the heated reformats.

Another fuel cell system is disclosed, which comprises an auto-thermal reformer, and a heat exchanger in fluid communication with the auto-thermal reformer. The heat exchanger emits thermal energy, wherein a selective emitter in thermal communication with the heat exchanger is adapted to produce infrared radiation from the thermal energy. The fuel cell system further includes a photovoltaic converter which is adapted to convert the infrared radiation to electricity.

Still another fuel cell system is disclosed, which comprises a thermophotovoltaic power generator module disposed in thermal communication with at least a portion of a heat exchanger of the fuel cell system.

Another fuel cell system is disclosed, which comprises an auto-thermal reformer, and a heat exchanger in fluid communication with the auto-thermal reformer. The fuel cell system further includes means for producing electricity from thermal energy harnessed from the heat exchanger, wherein the means for producing electricity is disposed around at least a portion of the heat exchanger.

A further fuel cell system is disclosed which comprises a plurality of thermoelectric heat exchangers adapted to each receive heat from an exhaust gas of a respective one of a plurality of heat sources in the fuel cell system. Each of the thermoelectric heat exchanger comprises a heat exchanger receiving the exhaust gas, a thermoelectric power generating module having a plurality of thermoelectric elements connected to form a first end surface and a second end surface, a first electrical insulator having a front side adjacent to the first end surface of the thermoelectric elements, and a second electrical insulator having a front side adjacent to the second end surface of the thermoelectric elements. The first electrical insulator has a rear side adjacent to a heat conduction wall of the heat exchanger. The heat conduction wall faces a hot fluid passageway for the exhaust gas to form a hot side of the heat exchanger, and the second electrical insulator has a rear side which faces a cold fluid passageway to form a cold side of the heat exchanger. A fluid return passageway communicates with the cold fluid passageway to permit cold fluid heated from an exchange of heat in the heat exchanger to be used in the fuel cell system.

Still another fuel cell system is disclosed, which comprises an auto-thermal reactor, and a plurality of thermoelectric heat exchangers adapted to each receive heat from an exhaust gas of a respective component of the fuel cell system. Each thermoelectric heat exchanger comprises a heat exchanger receiving the exhaust gas from the respective component of the fuel cell system, and a thermoelectric power generating module having a plurality of thermoelectric elements connected to form a first end surface and a second end surface. A first electrical insulator has a front side adjacent to the first end surface of the thermoelectric elements, and a second electrical insulator has a front side adjacent to the second end surface of the thermoelectric elements. The first electrical insulator has a rear side adjacent to a heat conduction wall of the heat exchanger. The heat conduction wall faces a hot fluid passageway for the exhaust gas to form a hot side of the heat exchanger, and the second electrical insulator has a rear side which faces a cold fluid passageway to form a cold side of the heat exchanger. A fluid return passageway communicates with the cold fluid passageway to permit cold fluid heated from an exchange of heat in the heat exchanger to be used in the fuel cell system.

A method of operating a fuel cell system is disclosed, which comprises operating an auto-thermal reformer to produce a reformate with thermal energy; providing the reformats to a heat exchanger in fluid communication with the auto-thermal reformer; harnessing a portion of the thermal energy of the reformate in the heat exchanger; and transforming the thermal energy into electricity.

A method of generating heat and electrical energy is also disclosed, which comprises supplying a fuel mixture to an auto-thermal reactor to generate reformats. The method further includes generating a temperature differential across a thermal-to-electric device to generate electricity for secondary power, and pre-heating components of the fuel mixture in a heat exchanger. The pre-heating comprises heat from the reformate, wherein the thermal-to-electric device is in thermal communication with the heat exchanger. The method further includes supplying the reformate to a fuel cell stack for generating electricity for primary power and secondary heat.

These and other features and advantages of the invention will be more fully understood from the following description of some embodiments of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the present invention.

DETAILED DESCRIPTION OF THE INVENTION

Figure 1:
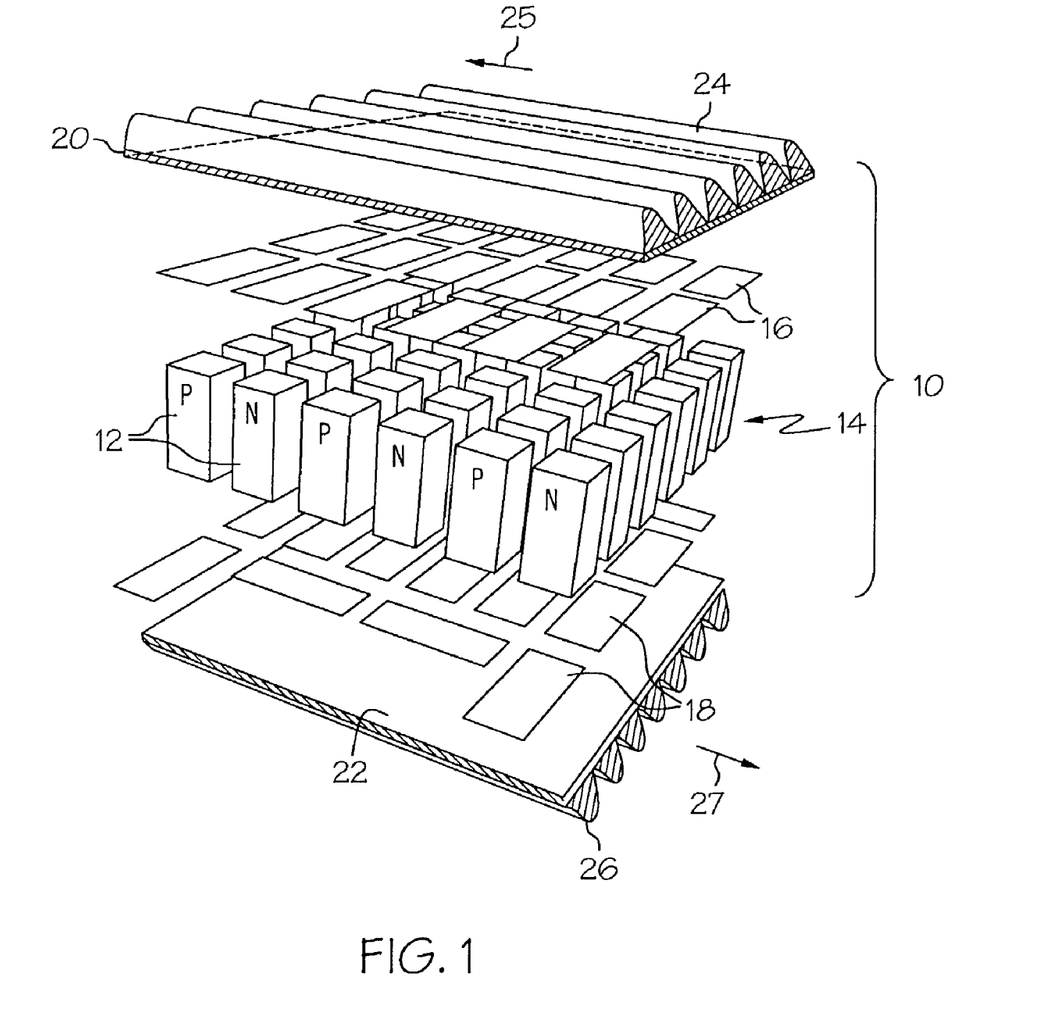
FIG. 1 is a perspective view showing one embodiment of a thermoelectric power generator module.

FIG. 1 is a perspective view showing one example of a thermal-to-electric device, in particular, a thermoelectric (TE) power generator module 10, used in the present invention. The TE power generator module 10 is a solid-state device that generates electricity as a function of the Seebeck Effect. The Seebeck Effect is the phenomenon where thermoelectric power generation results from electricity that is induced in particular materials by a temperature differential.

The TE power generator module 10 requires a heat source and a heat sink. The electric energy produced is a function of the source and sink temperatures ($T_h$ and $T_c$, respectively), the quantity of heat flowing from source to sink, and the characteristics of the TE material. Often the term thermoelectric figure of merit, ZT, is used to quantify the TE material capability. $ZT = \forall^2 T/\Delta\delta$, where $\forall$ is the Seebeck coefficient, T is the average temperature (absolute), $\Delta$ is the resistivity, and $\delta$ is the thermal conductivity. The efficiency of the TE power generator module 10 then can be estimated from the relationship $\Theta = [(\exists-1)/(\exists+1)][(T_h-T_c)/T_h]$, where $\exists = (1+ZT)^{1/2}$. Hence, the efficiency generally increases with increasing $T_h$ and decreasing $T_c$.

Typical values for commercially-available bulk material thermoelectric materials in the temperature range of interest (90° C. to 700° C.) are from about 0.9 to about 1.4. These include bismuth telluride (Bi2Te3), silicon germanium (SiGe), lead telluride (PbTe), and zinc cadmium antimony ($Zn_{3.2}Cd_{0.8}Sb_3$). Filled skuderite materials such as, for example $CeFe_{3.5}Co_{0.5}Sb_{12}$, have been shown to have ZT values of up to about 1.8. Most recently, nanostructured (thin-film layered) thermoelectric materials including superlattice heterostructures such as p-type $BiTe_3/Sb_2Te_3$ and n-type $Bi_2Te_3/Bi_2Te_{2.83}Se_{0.17}$ and "quantum well" materials such as $PbSe_{0.98}Te_{0.02}/PbRTe$ and $B_4C/B_9C$ (p-type) with Si/SiGe (n-type) have demonstrated ZT values from about 1.4 to about 4. Further refinements to nanostructured TE materials are projected to yield ZT values of about 8 corresponding to thermal-to-electric efficiencies about 50% of the corresponding Carnot efficiency potential. For example, a system with $T_h=300°$ C., $T_c=50°$ C. would have a Carnot efficiency of eff=100%*$(T_h-T_c)/T_h$=45%. With a quantum-well ZT of 8, the TE would have an efficiency of 22.5%.

As mentioned, the TE power generator module 10 utilizes semiconductor materials which are good conductors of electricity. These semiconductors are heavily doped to create an excess of electrons (N-type) or a deficiency of electrons (P-type). An N-type semiconductor will develop a negative charge on the cold side and a P-type semiconductor will develop a positive charge on the cold side. As used in the present invention, the TE power generator module 10 effectively and compactly converts a portion of the thermal energy flowing through each heat exchanger in the fuel cell system to electric energy. This electric energy is used to reduce the parasitic loads of the fuel cell system (compressors, fans, pumps, etc.), thereby increasing the net electric energy produced and the net system efficiency.

As shown in FIG. 1, the thermoelectric power generator module 10 has a plurality of thermoelectric elements 12 made of P-type semiconductor and N-type semiconductor. The P-type and N-type thermoelectric (TE) elements 12 are combined to form a thermoelectric element module 14. A suitable thickness for the TE elements 12 is from about 0.3 to about 3 mm. As mentioned above, filled skuderite materials, bismuth telluride ($Bi_2Te_3$), silicon germanium (SiGe), lead telluride (PbTe), zinc cadmium antimony ($Zn_{3.2}Cd_{0.8}Sb_3$), and nanostructured (thin-film layered) thermoelectric materials including superlattice heterostructures such as p-type $BiTe_3/Sb_2Te_3$ and n-type $Bi_2Te_3/Bi_2Te_{2.83}Se_{0.17}$ and "quantum well" materials such as $PbSe_{0.98}Te_{0.02}/PbRTe$ and $B_4C/B_9C$ (P-type) with $Si/Si_{0.8}Ge_{0.2}$ (N-type) are suitable TE element materials.

Conductors or metal plates 16 and 18 are arranged on both end surfaces of the thermoelectric element module 14 in such a manner that the TE elements 12 mutually made of P-type semiconductor and N-type semiconductor are connected in series. Then, electrical insulators 20 and 22 are provided on the end surfaces of the thermoelectric element module 14, covering the metal plates 16 and 18, respectively. Electrical insulators 20 and 22 in one embodiment are each a layer of alumina. In other embodiments, electrical insulators 20 and 22 may be aluminum oxide, mica, Kapton, sil-pad, a polyamide film, a thin silicon coated vinyl or rubber strip, or any other electrical insulator that provides zero electrical conductivity and high heat transfer.

Each electrical insulator 20 and 22 is provided adjacent to a respective heat conduction wall 24 and 26 of a heat exchanger. Additionally, in one embodiment, the heat conduction walls 24 and 26 each comprise a finned structure on one side and a smooth, flat surface on the other. In other embodiments, either one or both of the heat conduction walls 24 and 26 may have smooth, flat surfaces. In these embodiments, one of the heat conduction walls or heat sinks, for example 24, faces exhaust 25 from a fuel cell system component to form a hot side of the heat exchanger. The other heat conduction wall or heat sink, for example 26, faces a colder fluid 27 to form a cold side of the heat exchanger. Although the exhaust 25 and colder fluid 27 are illustrated as flowing counter to each other, the present invention may be used with cross-flow heat exchangers.

Heat conduction walls or heat sinks 24 and 26 may be any materials that provide a high thermal conductivity, a low thermal expansion rate, and a low dielectric constant. Such suitable heat sink materials include aluminum, steel, high nickel or super alloys, copper, copper tungsten (Cu—W), copper molybdenum, aluminum silicon carbide (Al—SiC), aluminum silicon (Al—Si), aluminum nitride ceramics (AlN), BeO, CuCrNb, tungsten, molybdenum, and niobium alloys, diamond-metal-composites (DMC), and combinations thereof. A layer of a heat transfer paste may also be included between the heat sinks 24 and 26 the respective electrical insulators 20 and 24.

Figure 2:
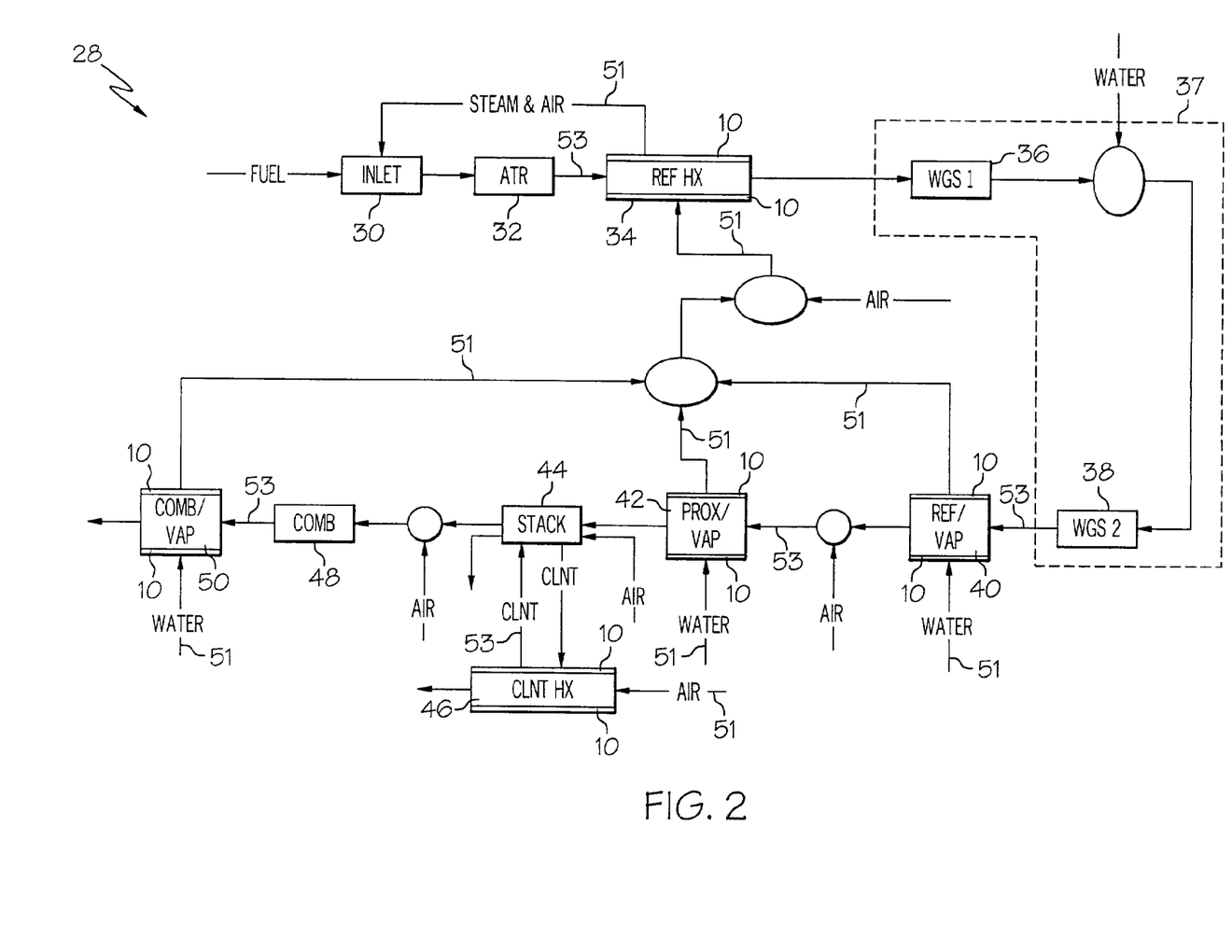
FIG. 2 is a schematic block diagram of an embodiment of a fuel processor-based cell system with PrOx and using thermoelectric heat exchangers in accordance with the present invention.

FIG. 2 shows an embodiment of a fuel processor-based fuel cell system 28, and a set of heat exchangers. Each of the illustrated heat exchange locations have been integrated with associated thermoelectric (TE) power generator modules 10 to generate supplemental electric power. As illustrated, the fuel cell system 28 includes an inlet 30, an auto-thermal reformer (ATR) 32, a reformate to ATR-steam-and-air heat exchanger (Ref HX) 34, and a CO-reduction reactor 37, such as first and second stage water gas shifts (WGS 1) 36 and (WGS 2) 38, respectively. The fuel cell system 28 further includes a reformate-to-water vaporizer (Ref/Vap) 40, preferential oxidation-to-water vaporizer (PrOx/Vap) 42, fuel cell stack 44, stack coolant-to-ambient air heat exchanger (Clnt HX) 46, combustor (Comb) 48, and combustor-to-water vaporizer (Comb/VAP) 50. The set of thermoelectric heat exchangers 34, 40, 42, 46, and 50 includes a heat exchanger to transfer heat from the exhaust exiting an upstream component of the fuel cell system 28, and integral TE power generator modules 10 to convert a portion of this heat energy into electrical energy.

Ref HX 34 includes a heat exchanger to transfer heat from the reformate exiting the ATR 32 with an exit temperature of 700 to 750° C., and integral TE power modules 10 to convert a portion of this heat energy into electrical energy. Ref HX 34 reduces the reformate temperature to 300 to 400° C. for proper operation of downstream CO-reduction reactor 37. Ref HX 34 uses the steam and air entering the ATR as the cooling fluid. In another embodiment, vaporizing water would be an alternative method of heat removal.

Figure 3:
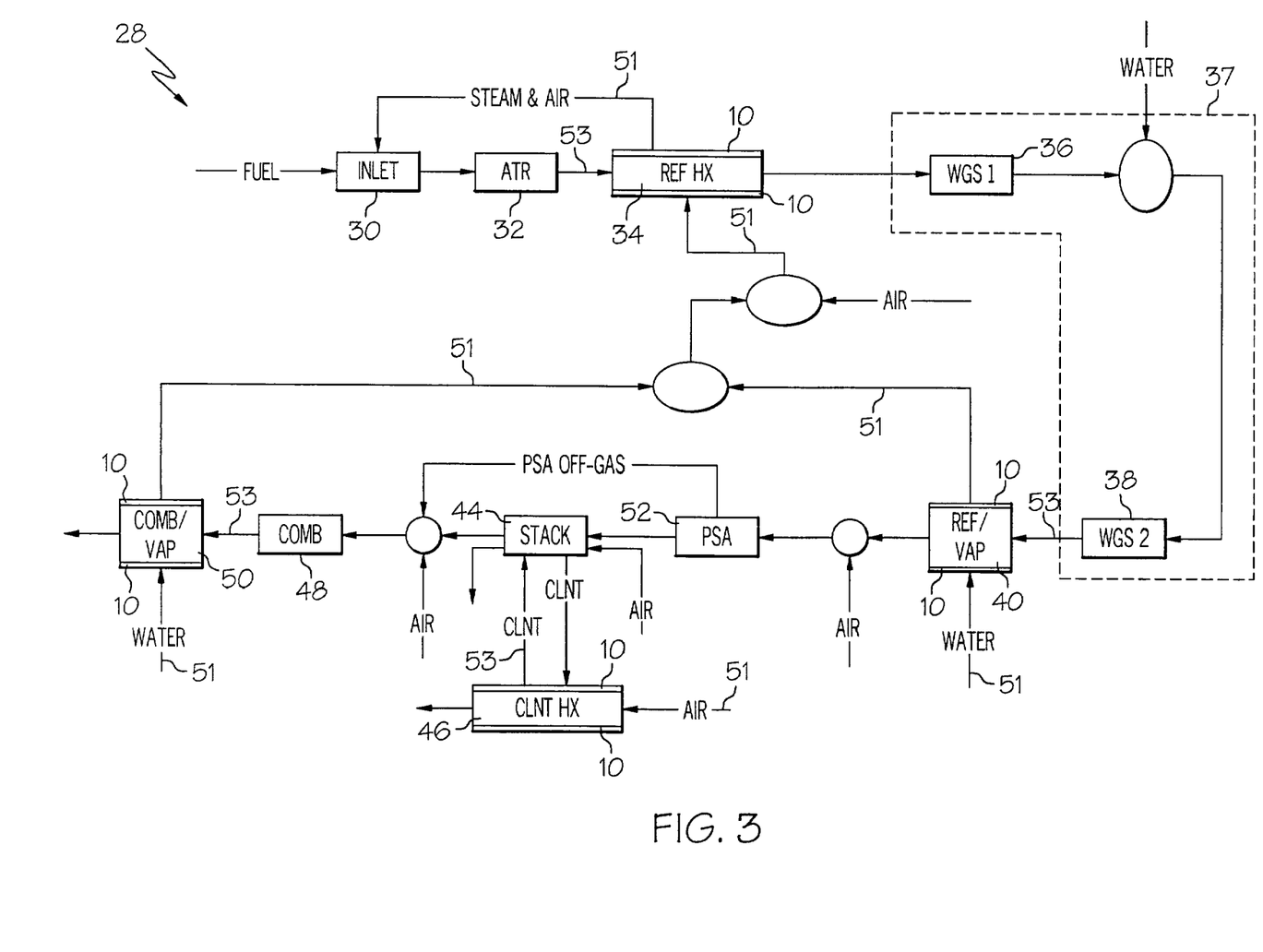
FIG. 3 is a schematic block diagram of another embodiment of a fuel processor-based cell system with PSA using and using thermoelectric heat exchangers in accordance with the present invention.

Ref/Vap 40 includes a heat exchanger to transfer heat from the reformate exiting the CO-reduction reactor 37 with an exit temperature of 300 to 400° C., and integral TE power modules 10 to convert a portion of this heat energy into electrical energy. The Ref/Vap 40 reduces the reformate temperature to 100 to 200° C. for final CO polishing via TE preferential oxidation (PrOx) reactor 42 (FIG. 2), or to 50 to 100° C. for a pressure-swing absorption (PSA) device 52 (FIG. 3). The Ref/Vap 40 vaporizes the water for use in the ATR 32. In another embodiment, an alternative design would use ambient air as the cooling fluid.

In fuel cell system embodiments using a PrOx reactor, a PrOx/Vap 42 is included in the set of thermoelectric heat exchangers. The PrOx/Vap 42 includes a heat exchanger to transfer heat from each PrOx stage and integral TE power modules 10 to convert a portion of this heat energy into electrical energy. The PrOx/Vap 42 is run adiabatically with a reformate temperature of 150 to 300° C. The PrOx/Vap 42 reduces the reformate temperature to 100 to 200° C., and vaporizes the water used in the ATR 32. In another embodiment, an alternative design would use ambient air as the cooling fluid. Additionally, the PrOx/Vap 42 could be run isothermally, which would effectively mean coating the thermoelectric vaporizer with the PrOx catalyst on the reformate (hot) side of the heat exchanger.

Clnt Hx 46 includes a heat exchanger to transfer heat from the fuel cell stack 44 and integral TE power modules 10 to convert a portion of this heat energy into electrical energy. In one embodiment, heat is removed from the stack 44 via an intermediate heat transfer fluid such as water or a water/glycol mixture. Then heat is transferred from this fluid to ambient air via the Clnt HX 46. The stack 44 and heat transfer fluid are operated at a relatively high temperature (>90° C.) to maximize the thermoelectric efficiency and to minimize the size and airflow of the Clnt HX 46.

Comb/Vap 50 includes a heat exchanger to transfer heat from the exhaust exiting the combustor 48 with an exit temperature of 300 to 800° C., preferably, 500 to 600° C., and integral TE power modules 10 to convert a portion of this heat energy into electrical energy. The Comb/Vap 40 vaporizes water to provide steam for stack humidification or fuel processing. The Comb/Vap 50 provides a uniform and low temperature heat sink, significantly increasing the efficiency of the TE power modules 10. Due to its high two-phase heat transfer coefficient, the Comb/Vap 50 is also typically very compact. In another embodiment, an alternative design the Comb/Vap 50 would use ambient air as the cooling fluid.

It is to be appreciated that the electric energy generated within the fuel cell system 28 and in particular, the combustor 48 is available more quickly than the primary electric power from the fuel cell stack 44. Such energy in one embodiment is used to aid in the startup of the system. In addition, if there were a fuel cell stack 44 failure, such as an electrical short, the set of fuel cell system heat exchangers 34, 40, 42, and 50 provide an independent method of generating electric power.

As illustrated, a fluid supply passageway 51 provides the cold fluid 27 (FIG. 1) to each thermoelectric heat exchangers 34, 40, 42, 46 and 50, and permits the cooled fluid heated from an exchange of heat in the heat exchanger to be used in other downstream components of the fuel cell system. An exhaust passageway 53 provides heated exhaust from a heat source component, for example, ATR 32, WGS 36 and 38, and stack 44, and combustor 48, of the fuel cell system to a respective upstream TE HX.

It is to be appreciated that the thermoelectric elements 14 are configured to provide a DC voltage output that matches the needs of the parasitic electric loads of the fuel cell system. This matching allows for a smaller stack DC-to-DC converter, saving mass, volume, energy, and cost. In one embodiment, the plurality of TE power generator modules 10 are configured in series such that the voltage produced is matched with the significant vehicle auxiliary electric loads including the radiator fan, pumps, blowers, and the like. Hence, no DC-DC conversion loss is incurred. The savings to the system is even greater since the generated amount of electric power is not needed to be put through the DC-DC converter used to step down the high stack voltage (typically >100 volts) to the lower (typically 12 or 42 volt) auxiliary level.

As shown in FIG. 2 and Table 1, there are several places within the fuel cell system that significant thermal energy is being transferred. Pinch analysis was applied to the fuel cell system 28 to minimize the quantity of waste heat and to select the optimum location(s) for integration of the thermoelectric power generator modules 10. Table 1 provides additional information about each thermoelectric heat exchanger (TE HX) 34, 40, 42, 46, and 50 and the estimated electric energy produced via integrating appropriate thermoelectric materials.

TABLE 1

|  | Comb/Vap | Ref HX | Ref/Vap | PrOx/Vap | Clnt HX |
|---|---|---|---|---|---|
| Hot Fluid | combustor exhaust | reformate | reformate | reformate | stack coolant |
| Inlet temp (C.) | ~650 | ~750 | ~350 | ~250 | ~100 |
| Outlet temp (C.) | ~250 | ~350 | ~150 | ~120 | ~90 |
| Cold Fluid | water | steam & air | water | water | ambient air |
| Inlet temp (C.) | ~60 | ~150 | ~60 | ~69 | ~30 |
| Outlet temp (C.) | ~150 | ~650 | ~150 | ~150 | ~80 |
| Q from hot (kW) | 20 | 22 | 11 | 14 | 60 |
| Q to cold (kW) | 18 | 21 | 10 | 12 | 59 |
| TE material | Filled skuderite | Filled skuderite | $Zn_{3.2}Cd_{0.8}Sb_3$ | $Zn_{3.2}Cd_{0.8}Sb_3$ | $Bi_2Te_3$ |
| TE Figure of Merit ZT @ Thot | 1.8 | 1.7 | 1.4 | 1.4 | 1 |
| TE efficiency | 8% | 4% | 6% | 5% | 1.50% |
| ~TE area ($m^2$) | 0.3 | 1 | 0.2 | 0.2 | 1.2 |
| Added volume (L) | 3.6 | 2 | 3 | 3 | 6 |
| Added mass (kg) | 2.8 | 1.4 | 2 | 2 | 9 |
| kWe from TE | 1.6 | 0.9 | 0.7 | 0.7 | 0.9 |

In the illustrated example, the values are based on a gasoline fuel cell system with a peak power of about 150 kW fuel, 120 kW hydrogen, 65 kW gross electric, and 50 kW net electric (prior to integrating the thermoelectric devices). Such a fuel cell system is a suitable size for a small to medium sized automobile.

From Table 1, the TE heat exchanger with the greatest TE efficiency and electric energy generation potential is the water vaporizer 50 at the exit of the combustor 48. Water vaporizer 50 is used to generate approximately half of the steam needed by the fuel processor (ATR and WGS). One reason the efficiency is so high (8%) is that the cold side remains fixed at a relatively low temperature corresponding to the water vaporization temperature (about 120° C. depending on the system pressure). A high two-phase heat transfer coefficient allows significant energy transfer in a relatively small mass and volume.

Current Comb/Vaps 50 have a specific heat transfer capacity of approximately 5 $kW_{th}$/kg and 10 $kW_{th}$/L. Mass and volume increase not only via the thermoelectric elements (between the hot and cold fluid passages), but also from adding a small heat exchanger (HX) downstream of the TE HX 50 to make up for the thermal resistance of the TE elements 12. The total mass and volume increase is shown in Table 1. From Table 1, the estimated amount of TE elements 12 needed to produce 1.6 kWe in a 50 kWe fuel cell system is about 0.3 $m^2$.

The reformate-to water vaporizer 40 after the second stage WGS 38 and the PrOx/water vaporizer 42 are also compact due to the high two-phase heat transfer coefficient on the cold side. The lower TE figure of merit and efficiency is due to the lower temperature of operation. The reformate to ATR-steam-and-air HX 34 is a gas-to-gas heat exchanger. Both the hot side and cold side have relatively low heat transfer coefficients and undergo large changes in temperature. Hence, the average temperature difference ($T_h-T_c$) is relatively small, resulting in a moderate 4% efficiency, and a substantial amount of TE material 12.

Finally, the stack coolant-to-ambient air HX 46 is the coolest temperature heat exchanger and the lowest TE figure of merit and 1.5% efficiency. It also requires the most TE material 12. However, due to the large amount of heat being rejected by this heat exchanger, it is second only to the combustor/vaporizer in total electric power produced.

The power density of each thermoelectric power generator module 10 with its associated heat exchangers is about 0.01 to about 0.15 W/$cm^2$ corresponding to a temperature difference between the electrical insulators 20 and 22 (FIG. 1). Taken together, about 4.8 kW of electric power is generated at normal operating temperatures.

It is to be appreciated that most, if not all of this energy comes from a decrease in the waste heat rejected to ambient. In the illustrated example, converting this waste heat energy to 4.8 kW of electricity via the plurality of TE power generator modules 10 increases the net system efficiency from 0=100%*(electric energy)/(fuel energy)=100%*(50 kW)/(150 kW)=33% to 100%*(54.8 kW)/(150 kW) 37%. Although this 37% efficiency assumes prefect thermal integration, the loss of energy to the fuel cell system 10 via thermoelectric extraction could be made up with a near-equal amount of fuel energy added to the ATR 32.

For example, there is about 3.7 kW of electric energy coming from the TE HX 34, 40, 42, and 50 in the illustrated example of Table 1. If this lost energy had to be made up via fuel energy, the net system efficiency would be: 0 of about 100%*(electric energy)/(fuel energy)=100%*(53.7 kW)/(153.7 kW)=35%. Hence, depending on the level of thermal integration, the illustrated 50-kWe system sees an increase in net efficiency from 33% without TE integration to between 35% and 37% with TE integration. Accordingly, within the fuel cell system 28, reintegrating heat provides a net gain in efficiency. Additionally, by adding heat exchanger surface area, this additional fuel energy could be kept to a minimum, approaching the value of the TE electric energy produced.

There are many possible alternatives to the illustrated fuel cell system shown in FIG. 2. FIG. 3 shows one such alternative. Instead of the PrOx 42 used in the fuel cell system 10 of FIG. 2, the system of FIG. 3 uses a pressure-swing absorber (PSA) 52 for carbon monoxide (CO) polishing. Although the PrOx water vaporizer 42 and associated TE power generator modules 10 are eliminated, the power of the combustor 48 increases due to the additional hydrogen from the PSA 52 off-gas. This in turn increases the electric power from the TE combustor exhaust/water vaporizer 50.

In general, if it is desired to use less water in the fuel processor, one or more of the water vaporizers 40, 42, and/or 50 could use ambient air or process (ATR) air as the cold-side fluid. Alternatively, the reformate HX 34 could be cooled via water vaporization although a decrease in fuel processor efficiency would probably result. In addition, the single-phase water or water/glycol mixture commonly used as the stack coolant in Clnt HX 46 could be replaced with a two-phase fluid, including water for high-temperature stacks. This could improve the efficiency of this TE application by having a more uniform cold-side temperature and the TE HX compactness by increasing the heat transfer coefficient on the cold side.

Of course, either the fuel reformer as a hydrogen production unit or the fuel cell stack being fueled by pure hydrogen could be operated separately. Various fuels can be used in the fuel processor including gasoline, natural gas, methanol, and ethanol. In addition to automotive and other mobile applications, a wide variety of stationary applications would benefit from the above-described inventions.

Finally, in addition to the thermoelectric power generator module 10 mentioned above, other methods of converting thermal energy directly to electric energy are being developed and could be applied in a similar manner. These include alkali metal thermal to electric converter (AMTEC), thermionic converter, and thermophotovoltaics. These devices are not as commercially available and typically require high temperatures for efficient operation (>500° C.). Recent advances, however, have lowered the minimum temperature into the 300° C. range, making them candidates for TE HX 34, 50, and possibly 40.

Figure 4:
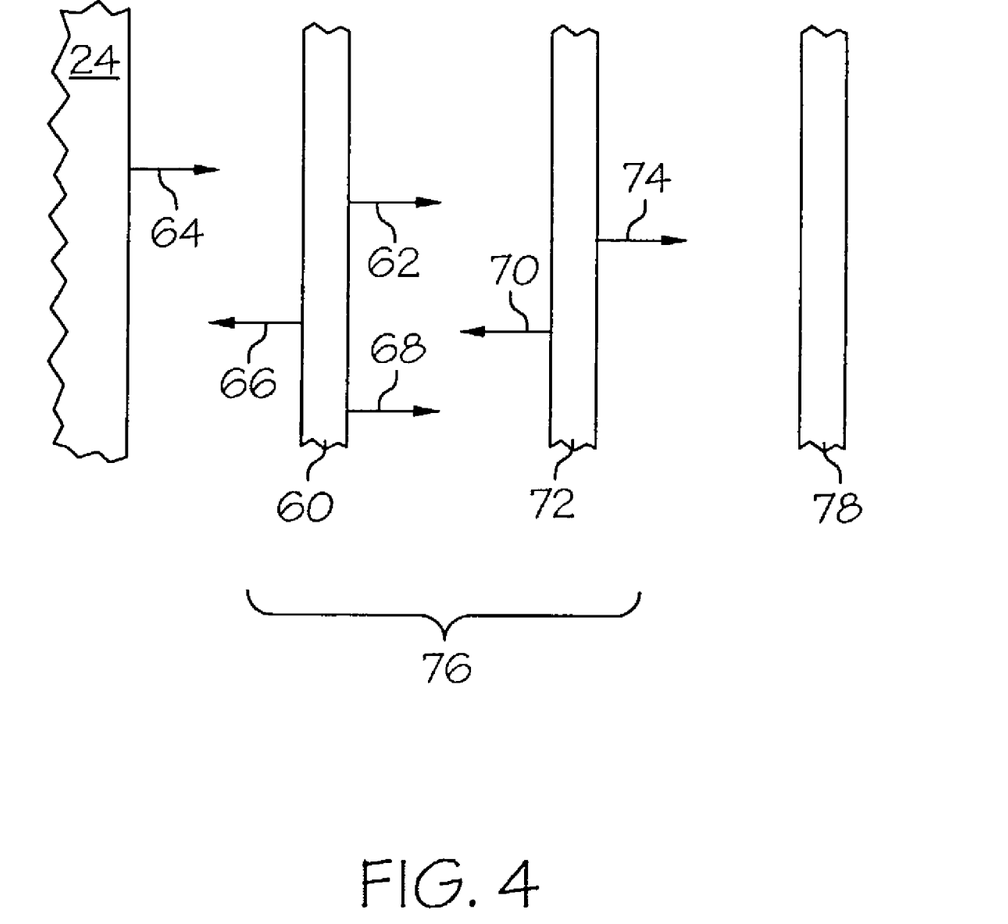
FIG. 4 is a schematic block diagram of the flow of thermal energy through a thermophotovoltaic power generator module suitable for use in a thermophotovoltaic high exchanger embodiment in accordance with the present invention.

For example, in an alternative embodiment illustrated by FIG. 4, instead of using thermoelectric elements, a selective emitter 60 can be provided. The selective emitter 60 would be provided in thermal communication with a heat source such as a heat conductive wall 24 of at least one of the heat exchangers providing suffice heat, such as for example Ref HX 32, Ref/Vap 40, PrOx/Vap 42, and Com/Vap 50, and/or ATR 32. The selective emitter 60 emits photons (light) in a limited spectral band (or infrared radiation) 62 when heated by waste heat emitted from the respective heat exchanger in the fuel cell system 28. The supply of thermal energy 64 to the selective emitter 60 results in recycled radiation 66 back to the heat exchanger and thermal convection 68 disseminating from the surface of the selective emitter 60. Although a portion of the flow of infrared radiation 62 from the selective emitter 60 may be reflected 70, the majority of the infrared radiation 62 flows through a photovoltaic converter 72 creating a photocurrent (or electricity) 74.

The selective emitter 60 can comprise a photovoltaic material that produces excited photons, such as yttrium, aluminum, garnet, silicon, carbon, and the like, as well as combinations comprising at least one of the foregoing materials. On the heat source side 61, the selective emitter 60 can be provided with a thin metal substrate comprising, or coated with, materials whose radiation emissivity is preferably maximum in a narrow spectral range. The selection of the material is dependent upon the operating temperature of the selective emitter 60 and can be determined by one of ordinary skill in the art. These materials include rare earth elements such as erbium, thulium, holmium, as well as gallium, antimony, indium, arsenic, aluminum, cobalt, platinum, radium, and the like, as well as alloys, oxides, and combinations comprising at least one of the foregoing materials. These materials preferably reflect the broadband radiation produced by the heat source.

The selective emitter 60 should be created from materials with a band gap that corresponds to the wavelength of the flow of thermal energy 64. Typically, electrons in the valence band of an atom cannot escape the atom. However, if an infrared photon containing the right amount of energy impacts an atom, an electron can be lifted to the conduction band and flow. The amount of energy needed to free an electron depends upon the electrical property known as the band gap. A low band gap maximizes light absorption, and hence the output current, while a high band gap maximizes output voltage. Therefore, a low band gap, i.e., about 0.55 electron-volt (eV) to about 1.1 eV photovoltaic converter can achieve higher efficiencies.

The selective emitter 60 transforms heat adsorbed thereby into infrared radiation 62 that can be efficiently converted by photovoltaic converters 72. A negligible amount of infrared radiation below the effective band gap of the photovoltaic converters 72 can be created and disseminated from the system. Thermal energy 64 is captured by the selective emitter 60 which, in turn, produces radiation 62 that is converted by the photovoltaic converters 72 into electricity 74.

The photovoltaic converters 72 preferably comprise a material designed to coincide with the emission spectrum of the selective emitter 60. These materials can be selected from materials found in Group III through Group IV on the periodic table, preferably including indium, gallium, arsenic, antimony, phosphorous, and the like, as well as alloys, oxides, and combinations comprising at least one of the foregoing materials.

The selective emitter 60 and a series of photovoltaic cells (or converters) 72 may be provided as a thermophotovoltaic power generator module 76 to convert heat radiation, from the heat source, into electricity by photovoltaic generation. The electricity generated by the thermophotovoltaic power generator module 76 can be used to provide a source of power for the fuel cell system or elsewhere.

The heat source provides thermal energy, in the form of waste heat from the fuel cell system 28, for recovery by the thermophotovoltaic power generator module 76 for processing into electricity. The fuel cell system 28 can provide a supply of thermal energy 64 of up to about 800° C. to the thermophotovoltaic power generator module 76.

Due to the proximity of the heat source (e.g., ref HX 34, ref/Vap 40, Comb/Vap 50) to the photovoltaic converter 72, the efficiency of the insulation can be greater than 80% because of the bi-directional exchange of the radiation between the heat source and the thermophotovoltaic power generator module 76. Thus, the recycled flow of radiation 66 can be reused by the heat source, which in turn produces more thermal energy for use by the thermophotovoltaic power generator module 76 to create electrical energy. In the alternative embodiment, at least one of the heat exchangers in the fuel cell system 28 can be surrounded (or encased) with the thermophotovoltaic power generator module 76, and optionally, an additional layer of a non-thermophotovoltaic material 78.

While the invention has been described by reference to certain preferred embodiments, it should be understood that numerous changes could be made within the spirit and scope of the inventive concepts described. In particular, although the set of TE HXs has been discussed in terms of being embodied in an auto-thermal hydrocarbon fuel cell system, it is to be understood that the principles embodied herein are equally applicable to fuel cells systems fueled by other endothermically reformable fuels such as methanol, ethanol or fossil fuels (e.g., methane or natural gas).

Additionally, although the set of TE HXs has been shown as part of a fuel processor having a water-gas shift reactor and a final stage scrubber (i.e., PrOx reactor or pressure swing absorber), other CO reducing mechanisms and arrangements may be used. Accordingly, it is intended that the invention not be limited to the disclosed embodiments, but that it have the full scope permitted by the language of the following claims.

What is claimed is:

1. A fuel cell system, comprising:
   an auto-thermal reformer producing a heated reformate from a provided fuel mixture through a chemical reaction;
   a gas-to-gas heat exchanger receiving said heated reformate directly from said auto-thermal reformer and exchanging with only combined steam and air components of said fuel mixture with thermal energy from said heated reformate before the combined steam and air components are provided to said auto-thermal reformer; and
   a thermoelectric module disposed in thermal communication with at least a portion of said gas-to-gas heat exchanger, and adapted to produce electricity from said heated reformate.

2. The fuel cell system of claim 1, wherein said thermoelectric module comprises filled skuderite materials, bismuth telluride ($Bi_2Te_3$), silicon germanium (SiGe), lead telluride (PbTe), zinc cadmium antimony ($Zn_{3.2}Cd_{0.8}Sb_3$), nanostructured (thin-film layered) thermoelectric materials, and combinations thereof.

3. The fuel cell system of claim 1, wherein said thermoelectric module is provided between a cooled fluid passageway and a reformate passage of said gas-to-gas heat exchanger.

4. The fuel cell system of claim 1, wherein said thermoelectric module is disposed in physical contact with said gas-to-gas heat exchanger.

5. The fuel cell system of claim 1, wherein said thermoelectric module is disposed within at least a portion of said gas-to-gas heat exchanger.

6. A method of operating a fuel cell system, comprising:
   operating an auto-thermal reformer to produce a reformate with thermal energy;
   providing said reformate directly to a gas-to-gas heat exchanger in fluid communication with said auto-thermal reformer, said gas-to-gas heat exchanger exchanging thermal energy from said reformate with only combined steam and air components of a fuel mixture before the combined steam and air components are provided to said auto-thermal reformer;
   harnessing a portion of said thermal energy of said reformate in said gas-to-gas heat exchanger; and
   transforming said thermal energy into electricity.

7. The method of claim 6, wherein said harnessing said thermal energy comprises using a thermoelectric module.

8. The method of claim 6, wherein said harnessing said thermal energy further comprises producing infrared radiation with a selective emitter.

9. The method of claim 6, further comprising converting said infrared radiation to electricity with a photovoltaic converter.

10. A method of generating heat and electrical energy, comprising:
    supplying a fuel mixture to an auto-thermal reactor to generate a reformate;
    generating a temperature differential across a thermal-to-electric device to generate electricity for secondary power;
    providing said reformate directly to a gas-to-gas heat exchanger;
    heating only combined steam and air components of said fuel mixture in said gas-to-gas heat exchanger with heat from said reformate, said thermal-to-electric device being in thermal communication with said gas-to-gas heat exchanger; and
    supplying said reformate to said fuel cell stack for generating electricity for primary power and secondary heat.

11. The method of claim 10, further comprising cooling one side of said thermal-to-electric device to increase said temperature differential.

12. The method of claim 10, wherein said fuel mixture comprises a hydrocarbon fuel, steam, and air.

13. The method of claim 10, wherein said thermal-to-electric device comprises thermoelectric power generator modules, and thermophotovoltaic power generator modules, and combinations thereof.

14. A fuel cell system, comprising:
    a fuel cell stack receiving a reformate and generating exhaust gases from said reformate;
    a combustor receiving said exhaust gases from said fuel cell stack and generating a combusted gas from said exhaust gases;
    an auto-thermal reformer producing said reformate from a provided fuel mixture through a chemical reaction;
    a gas-to-gas heat exchanger receiving said reformate directly from said auto-thermal reformer before being provided to said fuel cell stack and heating only combined steam and air components of said fuel mixture via thermal energy from said reformate before being provided to said auto-thermal reformer, wherein steam used in said fuel mixture receives thermal energy from said combusted gas before being combined and provided with non-fuel components to said gas-to-gas heat exchanger; and
    a thermoelectric module disposed in thermal communication with at least a portion of said gas-to-gas heat exchanger, and adapted to produce electricity from said heated reformate.

15. A method of operating a fuel cell system, comprising:
    generating a reformate from a fuel mixture provided to an auto-thermal reformer;
    providing said reformate directly to a gas-to-gas heat exchanger;
    heating only combined steam and air components of said fuel mixture in said gas-to-gas heat exchanger before being provided to said auto-thermal reformer using thermal energy from said reformate;
    generating exhaust gases from said reformate provided to a fuel cell stack, said reformate being provided to said fuel cell stack after said gas-to-gas heat exchanger;
    generating a combusted gas from said exhaust gases in a combustor;
    heating water used in said fuel mixture with thermal energy from said combusted gas before being provided to said gas-to-gas heat exchanger;
    harnessing a portion of said thermal energy of said reformate in said gas-to-gas heat exchanger; and
    transforming said thermal energy into electricity.

* * * * *

UNITED STATES PATENT AND TRADEMARK OFFICE
CERTIFICATE OF CORRECTION

| | | |
|---|---|---|
| PATENT NO. | : 7,625,647 B2 | Page 1 of 1 |
| APPLICATION NO. | : 10/315772 | |
| DATED | : December 1, 2009 | |
| INVENTOR(S) | : Steven D. Burch | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 823 days.

Signed and Sealed this

Twenty-first Day of December, 2010

David J. Kappos
*Director of the United States Patent and Trademark Office*